W. B. MITCHELL.
ADVERTISING SIGN FIGURE.
APPLICATION FILED SEPT. 28, 1921.
1,401,807.
Patented Dec. 27, 1921.
2 SHEETS—SHEET 1.
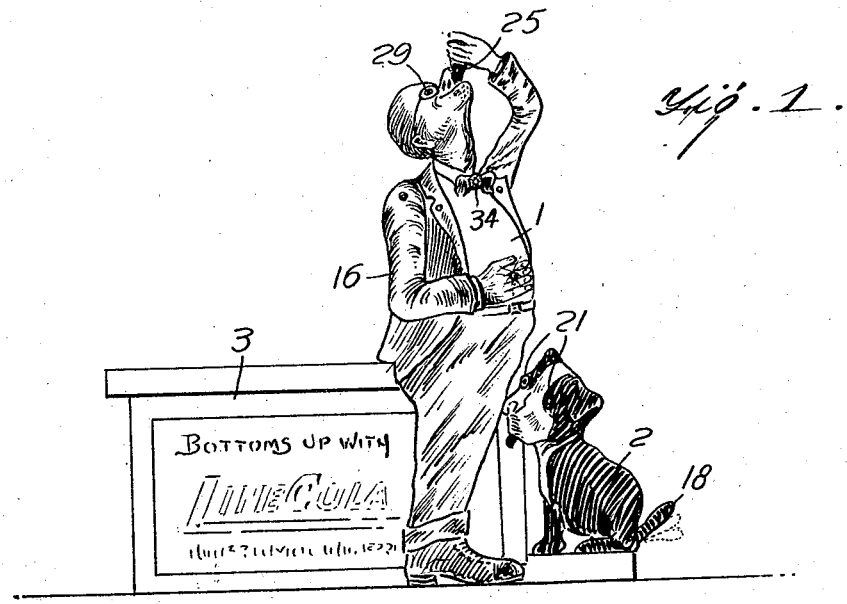
Fig. 1.
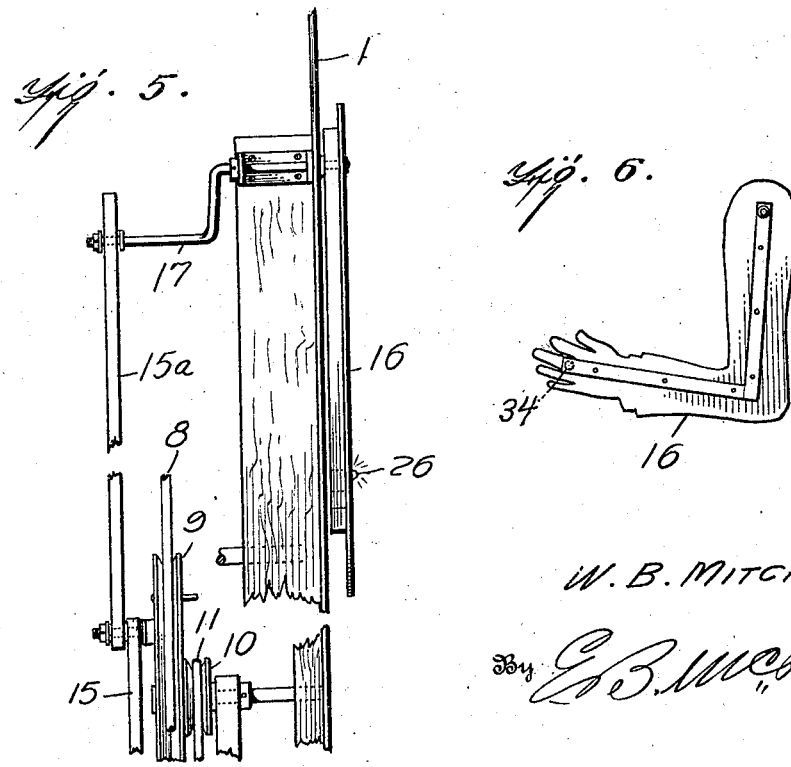
Fig. 5.
Fig. 6.
Inventor
W. B. MITCHELL,
By E. B. McBath
Attorney

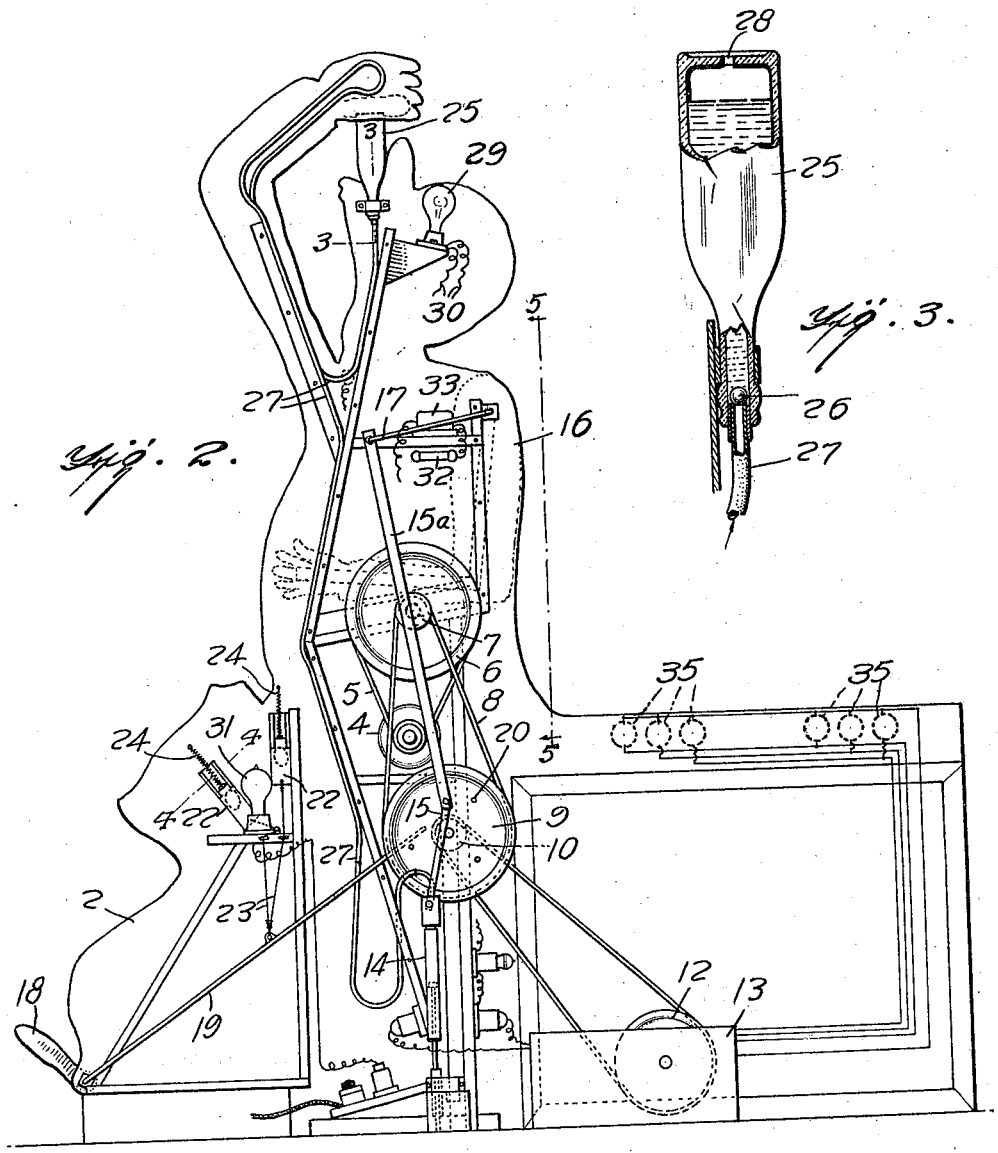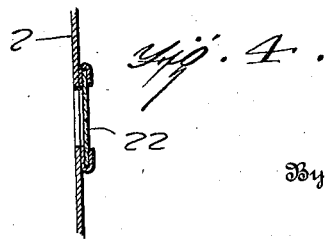

UNITED STATES PATENT OFFICE.

WILLIAM B. MITCHELL, OF MONTGOMERY, ALABAMA.

ADVERTISING-SIGN FIGURE.

1,401,807.     Specification of Letters Patent.     Patented Dec. 27, 1921.

Application filed September 28, 1921. Serial No. 503,867.

*To all whom it may concern:*

Be it known that I, WILLIAM B. MITCHELL, a citizen of the United States, and a resident of Montgomery, in the county of Montgomery and the State of Alabama, have invented certain new and useful Improvements in Advertising-Sign Figures, of which the following is a specification.

This invention relates to an advertising device designed to be placed in show windows and other public places for the purpose of advertising a beverage, the device simulating on one side the figure of a man and a dog, the man being shown in the act of drinking, and carrying on the opposite side certain actuating and illuminating means, the device as a whole being on a vertical flat surface, the exhibited face being painted to represent the desired figures.

The invention consists in the novel features of construction hereinafter described, pointed out in the claims and shown in the accompanying drawings, in which:—

Figure 1 is a front elevation of the device.

Fig. 2 is a rear elevation.

Fig. 3 is an enlarged section on the line 3—3 of Fig. 2.

Fig. 4 is a section on the line 4—4 of Fig. 2.

Fig. 5 is a section on the line 5—5 of Fig. 2.

Fig. 6 is a detail view of an arm.

The device as a whole is formed of metal on a wood frame the metal portions being flat on both front and rear faces and cut out and painted to represent, on its front face, the figure of a man, 1, a dog 2, and an ice box 3, the man being shown in the act of drinking from a bottle, the bottle being of the usual glass beverage type.

The operating and illuminating mechanism is arranged on the rear of the figure as follows:—

A motor 4 is centrally placed on the body portion and drives by a belt 5 a large pulley 6. A small pulley 7 fixed to the pulley 6 drives a belt 8 which also runs over a large pulley 9. A small pulley 10 fixed to the pulley 9 drives a pulley 12 of a flasher box 13. An air pump 14 is operated by a pitman 15 driven from pulley 9. From the same pulley is driven an upwardly extending pitman 15ª which is connected to a pivoted arm 16 through the medium of a crank lever 17. To the dog 2 is movably connected a tail 18 said tail being connected to a rod 19 which is struck and oscillated by pins 20 carried by the pulley 9, thereby giving the dog the appearance of wagging its tail, while the man through the movement of the arm 16 is represented as rubbing his stomach. The dog is also provided with eyes 21. These eyes are painted on the front of movable slides 22, and show through suitable openings cut in the metal. The slides 22 are connected by cords 23 with the striker arm 19, thereby imparting to the representation of the dog the appearance of rolling its eyes while wagging its tail. Springs 24 are connected to the slides 22 at the ends opposite the cords 23.

The bottle 25 is supported between an uplifted arm of the figure 1 and the mouth of said figure and is partially filled with the beverage being advertised. It is in inverted position and the mouth of the bottle is provided with a check valve 26. An air pipe 27 runs from the pump 14 to the bottle mouth, and the upper end of the bottle is provided with an air vent 28. Air is forced by the pump through pipe 27 and bottle will cause the liquid to bubble giving the figure of the man the appearance of drinking from the bottle.

To add further to the novelty of the figure for advertising purposes I provide the following illumination features: A hole is cut in the head of the figure 1 to represent an eye and a lamp is placed back of said opening as at 29 and is connected by a circuit 30 to the flasher 13 so as to light intermittently. A lamp is also placed between the slides 22, which are of transparent material, as at 31, to light the eyes of the dog. This lamp burns continuously and is connected to any suitable source of current. On the lapel of the man's coat is a transparent button and a 16 volt lamp 32 illuminates this and is connected to a transformer 33. A similar lamp 34 is placed on a finger of the movable arm 16 in such manner as to represent a diamond ring, and is wired so that movement of the arm makes and breaks the connection, to produce flashes of light from the simulated diamond. Over the ice box are placed lamps 35, arranged in colors and connected to the flasher.

The electric circuits are not shown in detail as no claim is made for them, the wiring being that which any competent electrician would adopt for the purpose intended.

The only movable portions of the figures and the only parts formed separately from the figures 1, 2 and 3 are the arm 16 of the man and the tail 18 of the dog, together with the eyes 21 which also might be considered as separate parts.

It will be noted that these parts are so connected that they operate in unison not only with each other but with the bubbling produced in the bottle by the operation of the pump.

The device will be usually placed in store windows or in stores where the beverage is sold, or in some other public place where electric current is available.

What I claim is:—

1. An advertising device comprising the representation of a person and an animal, a bottle inverted in the mouth of the person, an arm pivoted to the figure of the person, a tail loosely connected to the representation of the animal, movable slides carried by the latter and having representations of eyes thereon, said eyes being visible through suitable openings, and means carried on the rear portion of said device producing simultaneous movement in the said arm, tail and eyes, and also for acting on a liquid in the bottle to produce a bubbling thereof.

2. An advertising device comprising a flat vertically arranged sheet cut to form the outline of desired figures and having openings therein to form eyes, said sheet being painted on one side to simulate the figures to be represented, of movable members secured to said sheet, an inverted stationary bottle, and common means for moving the movable elements carried by the sheet, and for forcing air into a liquid carried by the bottle to produce bubbling therein, as and for the purpose set forth.

3. In a device of the kind described, the representation on a flat surface of certain figures, movable members carried by said figures, an inverted bottle carried by the device and having an air vent, a check valve in the bottle mouth preventing liquid from draining therefrom, an air vent in the bottom of the bottle, an air pump, a pipe leading from the pump to the bottle mouth, and a motor operably connected to the pump and to the movable members.

4. In an advertising device, a representation on a flat surface of a man and a dog, an inverted bottle adapted to hold a liquid arranged in the mouth of the man, means for forcing air into said liquid to produce bubbling, the figure of the dog having cut out portions for eyes, movable slides arranged back of said openings and having eyes formed thereon, and means for causing reciprocating movement of said slides at definite intervals of time during the injection of air into the liquid in the bottle.

5. In an advertising device, the combination with the representation of a man drinking, of a dog, openings being formed to correspond to the eyes of the dog, longitudinally movable slides covering said openings and having eyes painted thereon, a tail pivoted to the representation of the dog, a striker bar connected to the tail, a motor driven wheel having pins adapted to engage the striker bar, cords connecting said bar to the slides, and springs connected to the ends of the slides opposite the cords, as and for the purpose set forth.

In testimony whereof I affix my signature.

WILLIAM B. MITCHELL.